Patented Nov. 25, 1941

2,264,026

UNITED STATES PATENT OFFICE 2,264,026

MANUFACTURE OF 1-CYANOBUTADIENE-1,3

Herbert Gudgeon, Blackley, Manchester, England, assignor to Imperial Chemical Industries Limited, a corporation of Great Britain No Drawing. Application November 30, 1939, Serial No. 306,998. In Great Britain December 9, 1938

6 Claims. (Cl. 260—464)

This invention relates to an improved manufacture of 1-cyanobutadiene-1:3.

In co-pending application of Gudgeon and Hill, Serial No. 267,490, filed April 12, 1939, there is described the manufacture of 1-cyanobutadiene-1:3 by the thermal decomposition of certain carboxylic esters of acetaldolcyanohydrin in gaseous or vapor form at suitably elevated temperature.

I have now found that 1-cyanobutadiene-1:3 may also be made by similar thermal decomposition of certain esters of crotonaldehydecyanohydrin as further defined below. This second process shows advantages over the first. In general, the main advantage lies in the greater convenience and economy of the second. For instance, the esters of crotonaldehydecyanohydrin can be made from crotonaldehydecyanohydrin by acylating with one molecule of an acylating agent, whereas the esters of acetaldolcyanohydrin, which are used in the abovementioned application, can be made from acetaldolcyanohydrin only by acylating with two molecules of acylating agent, and consequently there is a saving on the acylating agent when working according to the present invention.

The esters of crotonaldehydecyanohydrin which are used in this invention are those of sulphurous, carbonic and aliphatic and aromatic mono- and di- carboxylic acids. Typical esters are the following: the acetate, propionate and benzoate of crotonaldehydecyanohydrin, the unsymmetrical carbonate obtained from crotonaldehydecyanohydrin and methyl chloroformate, the symmetrical carbonate obtained from crotonaldehydecyanohydrin and phosgene, the ester obtained from crotonaldehydecyanohydrin and the monomethyl ester of phthalic acid, the di-ester obtained from phthalic acid and crotonaldehydecyanohydrin and the sulphite ester of crotonaldehydecyanohydrin of the formula

$(CH_3.CH=CH.CH(CN).O.)_2SO$.

The acetic ester is especially suitable.

The heat treatment of the esters is conveniently effected in tubes or other containers through which gases or vapours may be passed, which may be of glass or other suitable material, and which may be empty or packed with glass, earthenware or other suitable contact material. The ester may be vapourised either in the tubes or before entering them, and the vapour may be diluted with nitrogen gas or benzene vapour, or other inert gas or vapour. The best temperature for the process depends upon the particular ester and upon the time of its contact with the heated surfaces. In general I have found that temperatures between 350–600° C. are satisfactory, and that temperatures of 450–550° C. are especially suitable.

It is not necessary to employ especially purified esters; the crude reaction product resulting from the acetylation of crotonaldehydecyanohydrin with acetic anhydride may be used as such with an obvious simplification in procedure.

The following examples, illustrate but do not limit the invention.

Example 1

The pyrolysis is effected in vertical borosilicate glass tubes. Each tube is 1 metre long, 5 cm. internal diameter, and packed for a length of 80 cm. with stainless steel Lessing rings. The tubes are heated to a temperature of about 470° C.

The crotonaldehydecyanohydrin acetate is fed by gravity at the rate of 200 gm. per hour to each tube and the heating is controlled to give a temperature between 450 and 470° C. during the passage.

The vapors which issue from the pyrolysis tubes are washed with 15% aqueous sodium carbonate solution. The washed condensate is fractionally distilled, the 1-cyanobutadiene-1:3 being collected at 48–50° C. under 24 cm. pressure. Nearly complete decomposition of the crotonaldehydecyanohydrin acetate takes place and a good yield of 1-cyanobutadiene-1:3 is obtained.

Example 2

Crotonaldehydecyanohydrin acetate is fed by gravity at the rate of 180 gm. per hour into a vertical borosilicate glass tube, which is empty except for a narrow central borosilicate glass tube containing a temperature measuring device. The tube is maintained at a temperature of 480–500° C. during the passage.

The vapors issuing from the pyrolysis tube are dealt with as described in Example 1. A good yield of 1-cyanobutadiene-1:3 is obtained.

Example 3

Crotonaldehydecyanohydrin benzoate dissolved in an equal weight of acetic acid is fed at a rate of 240 gm. of benzoate per tube per hour into tubes of the kind described in Example 1, packed with earthenware rings, and maintained at a temperature of 480–500° C. The issuing vapors are condensed and washed free from benzoic acid with 7% sodium hydroxide solution. The residue on distillation gives a good yield of 1-cyanobutadiene-1:3.

Example 4

Methyl-1-(1-cyano-2-butenyl)carbonate (B. P. 108° C./23 mm.; $n^{20}_D$ 1.4383; prepared by the reaction of methyl chloroformate with crotonaldehydecyanohydrin in the presence of pyridine) is fed at the rate of 240 gm. per tube per hour into packed tubes as described in Example 1, maintained at a temperature of 480–500° C. The issuing vapors are condensed, and fractionated directly in vacuo to give 1-cyanobutadiene-1:3.

Example 5

The crude phthalic ester of crotonaldehydecyanohydrin

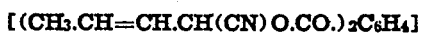

[(CH₃.CH=CH.CH(CN)O.CO.)₂C₆H₄]

prepared by the interaction of phthalol chloride and crotonaldehydecyanohydrin in the presence of pyridine, is dissolved in twice its weight of benzene and fed at a rate of 240 gm. of phthalate per tube per hour into tubes as described in Example 1, maintained at a temperature of 480–500° C. On working up the product as described in Example 3, 1-cyanobutadiene-1:3 is obtained.

Example 6

Crotonaldehydecyanohydrin propionate (B. P. 95–6° C./12 mm.; $n^{20}_D$ 1.4383; prepared by the interaction of propionyl chloride and crotonaldehydecyanohydrin in the presence of pyridine) is fed at a rate of 240 gm. per tube per hour into tubes as described in Example 1, maintained at 480–500° C. The issuing vapors are condensed, and on working up as in Example 1 a good yield of 1-cyanobutadiene-1:3 is obtained.

Example 7

Crotonaldehydecyanohydrin acetate is fed into a vertical stainless steel tube 54 inches long and 3 inches internal diameter, packed with earthenware beads, at the rate of 6 lbs. per hour. The tube is heated electrically so that the temperature along its axis increases gradually from about 200° C. near the top to about 550° C. near the bottom. The issuing vapors are condensed, and on working up as in Example 1 an excellent yield of 1-cyanobutadiene-1:3 is obtained.

I claim:

1. Process for the manufacture of 1-cyanobutadiene-1,3 which comprises heating an ester of crotonaldehydecyanohydrin to thermal decomposition temperature.

2. Process for the manufacture of 1-cyanobutadiene-1,3 which comprises heating an ester of crotonaldehydecyanohydrin to a temperature of between 350° C. and 600° C.

3. Process for the manufacture of 1-cyanobutadiene-1,3 which comprises heating an ester of crotonaldehydecyanohydrin to a temperature of between 450° C. and 550° C.

4. Process for the manufacture of 1-cyanobutadiene-1,3 which comprises heating crotonaldehydecyanohydrin acetate to thermal decomposition temperature.

5. Process for the manufacture of 1-cyanobutadiene-1,3 which comprises heating crotonaldehydecyanohydrin acetate to a temperature between 350° C. and 600° C.

6. Process for the manufacture of 1-cyanobutadiene-1,3 which comprises heating crotonaldehydecyanohydrin acetate to a temperature between 450° C. and 550° C.

HERBERT GUDGEON.